(12) United States Patent
Warkentin et al.

(10) Patent No.: US 10,067,784 B2
(45) Date of Patent: Sep. 4, 2018

(54) HYPERVISOR BACKDOOR INTERFACE

(71) Applicant: VMware, Inc., Palo Alto, CA (US)

(72) Inventors: Andrei Warkentin, Wakefield, MA (US); Harvey Tuch, Cambridge, MA (US); Cyprien Laplace, Cambridge, MA (US); Alexander Fainkichen, Southborough, MA (US)

(73) Assignee: VMware, Inc., Palo Alto, CA (US)

( * ) Notice: Subject to any disclaimer, the term of this patent is extended or adjusted under 35 U.S.C. 154(b) by 260 days.

(21) Appl. No.: 15/184,455

(22) Filed: Jun. 16, 2016

(65) Prior Publication Data
US 2017/0364379 A1 Dec. 21, 2017

(51) Int. Cl.
| | |
|---|---|
| G06F 9/455 | (2018.01) |
| G06F 9/38 | (2018.01) |
| G06F 11/36 | (2006.01) |
| G06F 13/24 | (2006.01) |
| G06F 9/48 | (2006.01) |

(52) U.S. Cl.
CPC ........ *G06F 9/45558* (2013.01); *G06F 9/3861* (2013.01); *G06F 11/362* (2013.01); *G06F 9/4812* (2013.01); *G06F 13/24* (2013.01); G06F 2009/45591 (2013.01); G06F 2209/481 (2013.01)

(58) Field of Classification Search
None
See application file for complete search history.

(56) References Cited

PUBLICATIONS

"ARM® Cortex®-A53 MPCore Processor Technical Reference Manual" Feb. 14, 2014, Revision: r0p2.*

* cited by examiner

*Primary Examiner* — Qing Yuan Wu
(74) *Attorney, Agent, or Firm* — Patterson + Sheridan, LLP (57) ABSTRACT

A method of providing a backdoor interface between software executing in a virtual machine and a hypervisor executing on a computing system that supports the virtual machine includes trapping, at the hypervisor, an exception generated in response to execution of a debug instruction on a central processing unit (CPU) by the software; identifying, by an exception handler of the hypervisor handling the exception, an equivalence between an immediate operand of the debug instruction and a predefined value; and invoking, in response to the equivalence, a backdoor service of the hypervisor using state of at least one register of the CPU as parametric input, the state being set by the software prior to executing the debug instruction.

20 Claims, 4 Drawing Sheets

HYPERVISOR BACKDOOR INTERFACE

BACKGROUND

Computer virtualization is a technique that involves encapsulating a physical computing machine platform into virtual machine(s) executing under control of virtualization software on a hardware computing platform or "host." A virtual machine provides virtual hardware abstractions for processor, memory, storage, and the like to a guest operating system. The virtualization software, also referred to as a "hypervisor," includes one or more virtual machine monitors (VMMs) to manage the virtual machine(s). Each virtual machine supports the execution of a guest operating system (OS) and software on top of the guest OS.

To provide a better end-user experience, a virtual machine can include software tools that interact directly with components in the hypervisor through a "backdoor interface," making the guest OS "virtualization-aware." These software tools include components that run in both kernel mode and in user mode within the virtual machine. Some microprocessor architectures do not support instructions that can be used to implement a backdoor interface between software in a virtual machine and components of a hypervisor. Even if a hypervisor call (hypercall) instruction is supported in kernel mode, such instructions can be available only in a privileged execution mode of the microprocessor. In such a case, user mode software in a virtual machine that executes in an unprivileged mode cannot use such instructions to directly access the hypervisor. Thus, the software tools are not fully functional on these microprocessors.

SUMMARY

One or more embodiments relate to a method of providing a backdoor interface between software executing in a virtual machine and a hypervisor executing on a computing system that supports the virtual machine. The method includes trapping, at the hypervisor, an exception generated in response to execution of a debug instruction on a central processing unit (CPU) by the software; identifying, by an exception handler of the hypervisor handling the exception, an equivalence between an immediate operand of the debug instruction and a predefined value; and invoking, in response to the equivalence, a backdoor service of the hypervisor using state of at least one register of the CPU as parametric input, the state being set by the software prior to executing the debug instruction.

Further embodiments include a non-transitory computer-readable storage medium storing instructions that, when executed by a computing device, cause the computing device to perform the method set forth above, and a computing device programmed to carry out the method set forth above.

DETAILED DESCRIPTION

Figure 1:
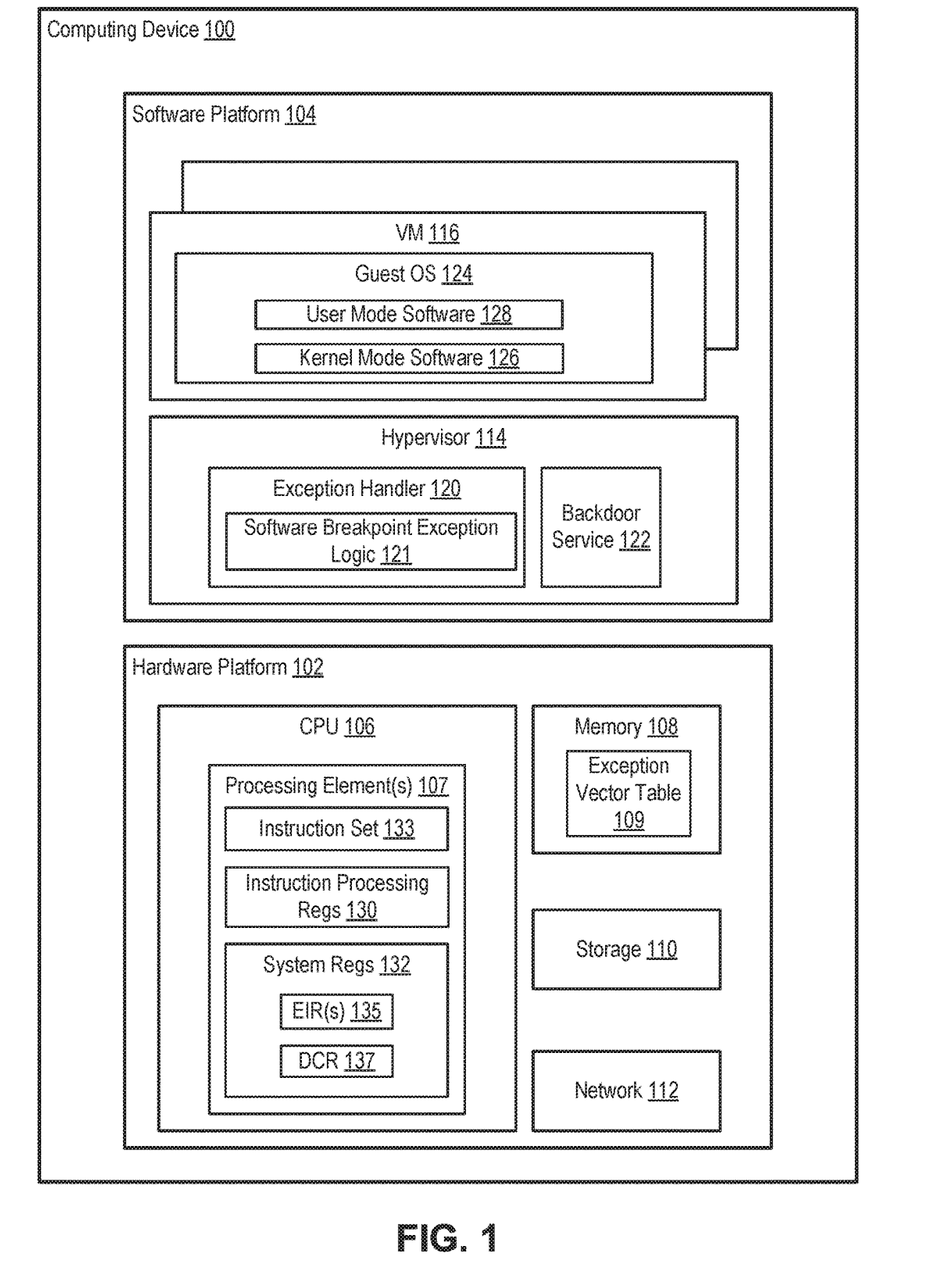
FIG. 1 is a block diagram of a computing device according to an embodiment.

FIG. 1 is a block diagram of a computing device 100 according to an embodiment. Computing device 100 includes a software platform 104 executing on a hardware platform 102. Hardware platform 102 includes a central processing units (CPU) 106, system memory 108 (also referred to as "memory 108"), storage 110, and a network interface 112. CPU 106 is configured to execute instructions, for example, executable instructions that perform one or more operations described herein. Such executable instructions can be stored in memory 108 and/or in storage 110. Memory 108 includes devices allowing information, such as executable instructions and data, to be stored and retrieved. Memory 108 may include, for example, one or more random access memory (RAM) modules. Network interface 112 enables computing device 100 to interface with a network (not shown). Storage 110 includes local storage devices (e.g., one or more hard disks, flash memory modules, solid state disks, and optical disks) and/or storage interfaces to network data storage systems (not shown). Example network data storage systems include storage area networks (SANs), a network-attached storage (NAS), and the like. Hardware platform 102 is just one example hardware platform that can be used in embodiments described herein. In general, any hardware platform that includes at least a CPU and memory can be employed.

CPU 106 includes one or more processing elements 107 (e.g., one or more microprocessors) and can optionally include other system components, such as a graphics processing unit (GPU), memory, timing sources, peripherals, external interfaces, and the like. A processing element 107 of CPU 106 can include instruction processing registers 130, system registers 132, and an instruction set 133. Instruction processing registers 130 include general purpose registers, stack pointer registers, floating point registers, program status registers, program counter register, and the like, or any combination thereof. System registers 132 include various registers that control execution in processing element 107, provide status of processing element 107, and provide for general configuration of processing element 107. Instruction set 133 includes the instructions supported by processing element 107.

Processing element 107 executes instructions using a plurality of execution privilege levels (EPLs). In an embodiment, processing element 107 includes first, second, and third EPLs in order of increasing privilege. Execution at the first EPL, which has the least privilege, is referred to as unprivileged execution ("unprivileged execution level"). The third EPL provides features that support virtualized operation of processing element 107. Execution at the third EPL, which has more privilege than the first and second EPLs, is referred to as virtualized execution ("virtualization execution level"). Execution at the second EPL, which has privilege between that of the first and third EPLs, is referred to as supervisor execution ("supervisor execution level").

Instruction set 133 includes a software breakpoint instruction that is executable at all privilege levels. When executed, the software breakpoint instruction causes processing element 107 to generate a software breakpoint instruction exception. In general, an exception includes a target EPL, which is the same or higher than the EPL of the instruction that generated the exception. Processing element 107 saves information characterizing the reason for the exception in one of system registers 132, referred to herein as an exception information register (EIR) 135. Processing element 107 can include a plurality of EIRs 135, one for each EPL. In response to an exception, processing element 107 moves to the target EPL and starts executing instructions at an address defined by an exception vector stored in an exception vector table 109 in memory 108.

Processing element 107 saves information for routing the software breakpoint instruction exception in one of system registers 132, referred to herein as a debug configuration register (DCR) 137. By default, the software breakpoint instruction exception targets the second EPL. DCR 137 includes a field that, when set to a predefined value, causes the software breakpoint instruction exception originating in the first or second EPL to be routed to the third EPL rather than the second EPL.

The software breakpoint instruction is intended to be used during software debugging to pause execution of a program so that the state of registers and/or memory can be analyzed. As described in embodiments herein, the software breakpoint instruction is leveraged to provide a backdoor interface between software executing in a virtual machine and a hypervisor that supports the virtual machine. The technique relies on the fact that debug instruction is universally available and can be executed at any privilege level. The software breakpoint instruction is, in general, a type of instruction that triggers a debug exception ("debug instruction"). Thus, while the software breakpoint instruction is described in embodiments herein, any debug instruction that is executable at the first EPL (e.g., unprivileged execution level) and that triggers a debug exception that can be trapped at the third EPL (e.g., virtualization privilege level) can be used to implement the backdoor interface.

Notably, processing element 107 can include other types of exception-generating instructions, including those specifically intended to generate exceptions targeting a specific EPL. For example, instruction set 133 can include hypercall instruction that generates an exception that targets the third EPL. However, in an embodiment, such an instruction can only be executed at the second EPL or higher (i.e., not executable at the first EPL). In an embodiment, instruction set 133 does not include an instruction executable at the first EPL that can generate an exception targeting the third EPL.

Example processing elements that are structurally and functionally similar to processing element 107 include processing elements compliant with the ARMv8 architecture developed by ARM Ltd. located in Cambridge, United Kingdom, such as ARM® Cortex®-based microprocessors commercially available from ARM Ltd. For example, the ARMv8 architecture includes a 64-bit execution state (referred to as AArch64) and a corresponding 64-bit instruction set (referred to as A64). The A64 instruction set includes an instruction BRK #<imm16> that triggers a software breakpoint instruction generating a corresponding software breakpoint instruction exception. The BRK instruction takes a 16-bit immediate operand in the range of decimal 0 to 65535. The ARMv8 architecture defines Exception levels EL0 to EL3, where EL0 is for unprivileged execution, EL2 provides features for virtualization of operation, and EL1 is used for supervisor execution (e.g., kernel mode software executing in a guest operating system). The BRK instruction is executable at EL0 (an implementation of the first EPL described herein). The software breakpoint instruction exception generated by execution of the BRK instruction by default targets EL1. However, the ARMv8 architecture defines a system register, MDCR_EL2 (an implementation of DCR 137), having a field TDE that can be set to trap the software breakpoint instruction exception at EL2 (an implementation of the third EPL described herein). The A64 instruction set also includes a hypercall instruction HVC #<imm16> that triggers a hypervisor call exception targeting EL2. However, the hypercall instruction HVC is not executable at EL0 and thus cannot be used by unprivileged code. Although ARMv8 is described as an example processing element architecture, those skilled in the art will appreciate that any processing element architecture similar to ARMv8 and that has a structure and function similar to processing element 107 described herein can be used.

Software platform 104 includes a hypervisor 114. Hypervisor 114 comprises all or a portion of virtualization software that abstracts processor, memory, storage, and networking resources of hardware platform 102 into multiple virtual machines (VMs) 116 that run concurrently on computing device 100. VMs 116 run on top of hypervisor 114, which implements platform virtualization and enables sharing of the hardware resources of computing device 100 by VMs 116. One example of hypervisor 114 that may be configured and used in embodiments described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Each VM 116 supports execution of a guest operating system (OS) 124, which can be any commodity operating system known in the art, such as Linux®, Microsoft Windows®, Mac OS®, or the like.

In an embodiment, hypervisor 114 is a Type-1 hypervisor (also referred to as a "bare-metal hypervisor") that executes directly on hardware platform 102. Hypervisor 114 executes at the third EPL of CPU 106 in order to use the virtualization features provided by CPU 106. Guest OS 124 can execute at the second EPL (supervisor execution level). Guest OS 124 can support kernel mode software 126 and user mode software 128. Kernel mode software 126 can execute at the second EPL alongside guest OS 124. User mode software 128 executes at the first EPL (unprivileged execution level).

Both user mode software 128 and kernel mode software 126 (including guest OS 124) can communicate with hypervisor 114 through a backdoor interface. The majority of software executing in a VM is "unaware" of hypervisor 114 (i.e., the software operates as if executing directly on hardware platform 102). However, some software executing in a VM can be made "aware" of hypervisor 114 in order to provide a better end-user experience. For example, virtual machines supported by the VMware ESXi™ hypervisor can include software installed therein that allows the guest OS to communicate directly with components of the hypervisor (referred to as "VMware Tools™"). Some parts of VMware Tools™ execute as kernel mode software, while other parts execute as user mode software. VMware Tools™ is just one example of software that can take advantage of the backdoor interface with hypervisor 114. The guest OS can execute at either EL0 or EL1.

Hypervisor 114 includes exception handler 120 and backdoor service 122. Exception handler 120 is configured to handle exceptions targeting the third EPL. During initialization and boot, hypervisor 114 can set an entry in exception vector table 109 to point to an address of exception handler 120 so that CPU 106 invokes exception handler 120 to handle exceptions targeting the third EPL. Exception handler 120 includes software breakpoint exception logic 121 configured to handle software breakpoint instruction exceptions. Software breakpoint exception logic 121 can invoke backdoor service 122 in response to the exception satisfying particular criteria, as discussed further below. Thus, both user mode software 128 and kernel mode software 126 can use a software breakpoint instruction as a backdoor interface to backdoor service 122 in hypervisor 114.

Figure 6:
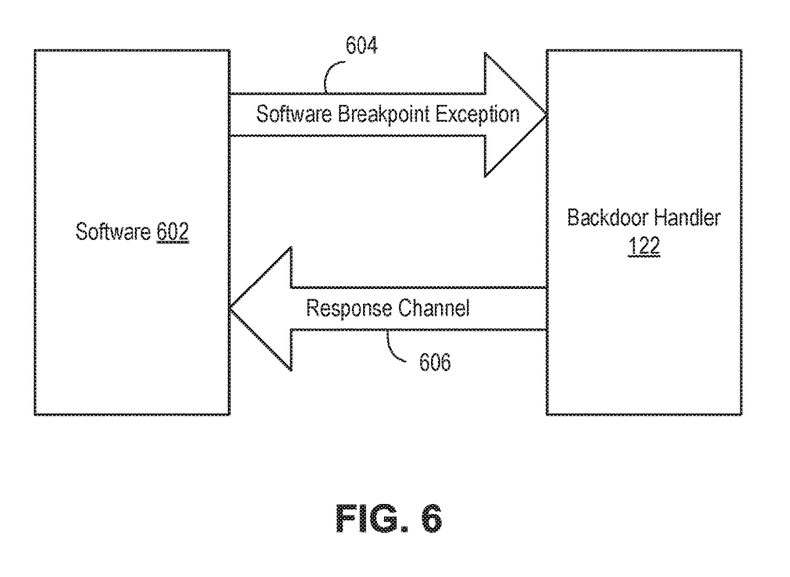
FIG. 6 is a block diagram depicting a logical view of a backdoor interface between software executing in a virtual machine and a backdoor service of a hypervisor supporting execution of the virtual machine.

FIG. 6 is a block diagram depicting a logical view of a backdoor interface between software 602 executing in a virtual machine and backdoor service 122 of hypervisor 114 supporting execution of the virtual machine. Software 602 can include user mode software and/or kernel mode software. Software 602 includes a downstream backdoor interface 604 to backdoor service 122. Downstream backdoor interface 604 is implemented using software breakpoint instructions and software breakpoint exceptions, as discussed further below. In embodiments, software 602 includes an upstream backdoor interface 604 from backdoor service 122. Upstream backdoor interface 604 is implemented using a separate response channel from that of downstream backdoor interface 604. Examples of the response channel are described further below.

Figure 2:
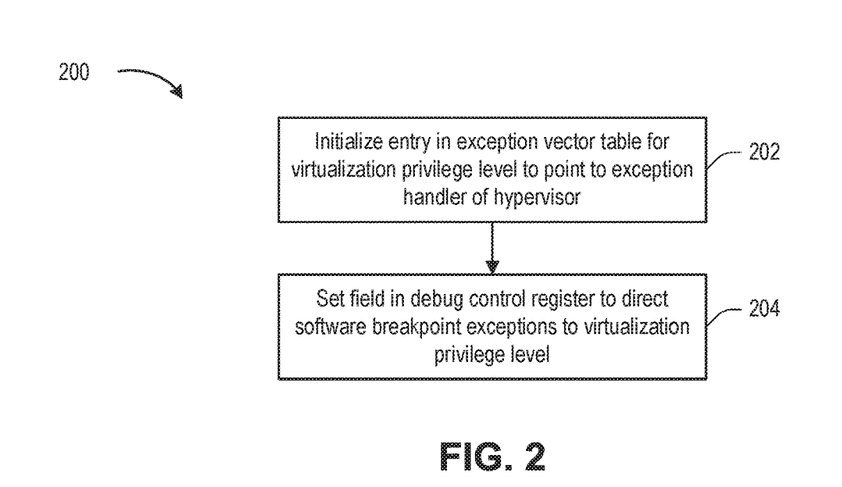
FIG. 2 is a flow diagram depicting a method of initializing a backdoor interface according to an embodiment.

FIG. 2 is a flow diagram depicting a method 200 of initializing a backdoor interface according to an embodiment. Method 200 can be performed by hypervisor 114 during boot and initialization. Method 200 begins at step 202, where hypervisor 114 initializes an entry in exception vector table 109 for the third EPL (e.g., virtualization privilege level) to point to exception handler 120. For example, exception vector table 109 can include an entry for each EPL supported by CPU 106. Hypervisor 114 includes exception handler 120 to handle exceptions generated by CPU 106 that target the virtualization privilege level. Exception handler 120 is resident in memory 108 and hypervisor 114 sets the corresponding entry in exception vector table 109 to point to the start address of exception handler 120. Upon generation of an exception targeting the third EPL, CPU 106 will lookup exception vector table 109 and branch execution to the start address of exception handler 120. At step 204, hypervisor 114 sets a field in DCR 137 to trap software breakpoint instruction exceptions (regardless of source privilege level) at the third EPL (e.g., virtualization privilege level). Thus, CPU 106 redirects software breakpoint instruction exceptions generated by execution of software breakpoint instructions to exception handler 120 in hypervisor 114, rather than to an exception handler in guest OS 124.

Figure 3:
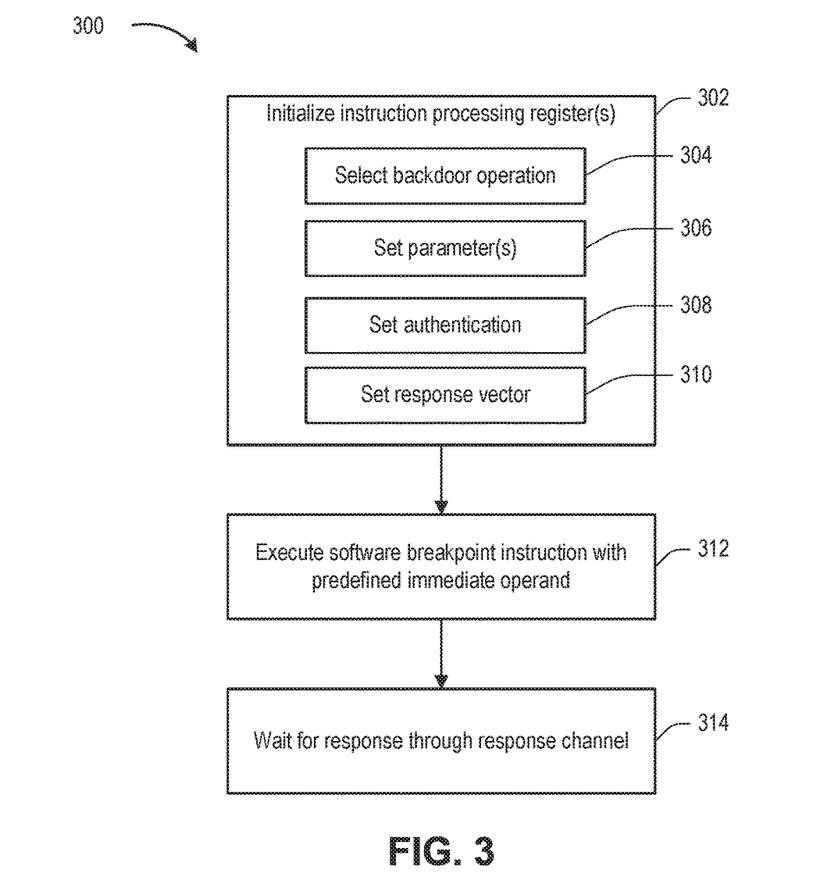
FIG. 3 is a flow diagram depicting a method of invoking a backdoor interface to a hypervisor from software executing in a virtual machine supported by the hypervisor according to an embodiment.

FIG. 3 is a flow diagram depicting a method 300 of invoking a backdoor interface to hypervisor 114 from software executing in a virtual machine supported by hypervisor 114 according to an embodiment. Method 300 can be performed by user mode software 128 and kernel mode software 126. Method 300 begins at step 302, where the software initializes one or more of instruction processing registers 130. The software initializes instruction processing register(s) 130 with a state that comprises input parameters for the backdoor interface. For example, at step 304, the software can set instruction processing register(s) 130 to select a backdoor operation of a plurality of backdoor operations supported by backdoor service 122. At step 306, the software can set instruction processing register(s) 130 to save one or more input parameters to the selected backdoor operation. At step 308, the software can set instruction processing register(s) 130 to save authentication information for authenticating the selected backdoor operation. Authentication is described further below. At step 310, the software can set instruction processing register(s) 130 to save information to implement the response channel between the software and backdoor service 122. For example, the software can provide memory address(es) at which backdoor service 122 can use to return information to the software.

At step 312, the software executes a software breakpoint instruction on CPU 106 with a predefined immediate operand. Software breakpoint instruction in instruction set 133 includes an immediate operand. Exception handler 120 in hypervisor 114 is configured to detect a predefined value of the immediate operand indicative of a backdoor interface request. In response to the software breakpoint instruction, CPU 106 generates a software breakpoint exception, which is handled by exception handler 120 in hypervisor 114. After processing the exception, exception handler 120 returns execution to the software. At step 314, the software can wait for a response through the response channel (e.g., memory 108). Alternatively, the selected backdoor operation can be a request that does not include a response and thus step 314 can be omitted. An example of method 300 is shown in the following assembly language pseudocode:

```
mov x0, #BACKDOOR_CALL_NUM
mov x1, #BACKDOOR_PARAM1
mov x2, #BACKDOOR_PARAM2
brk #0xBD00
```

In the example pseudocode, a register x0 is set to save a call number of a selected backdoor service. A register x1 is set to save a first parameter of the backdoor service and a register x2 is set to save a second parameter of the backdoor service. A software breakpoint instruction brk is executed having an immediate operand with a value of 0xBD00 hexadecimal. The value 0xBD00 is a predefined value indicative of a backdoor request to backdoor service 122 in hypervisor 114 (e.g., a "magic number" indicating an intent to invoke the backdoor interface).

Figure 4:
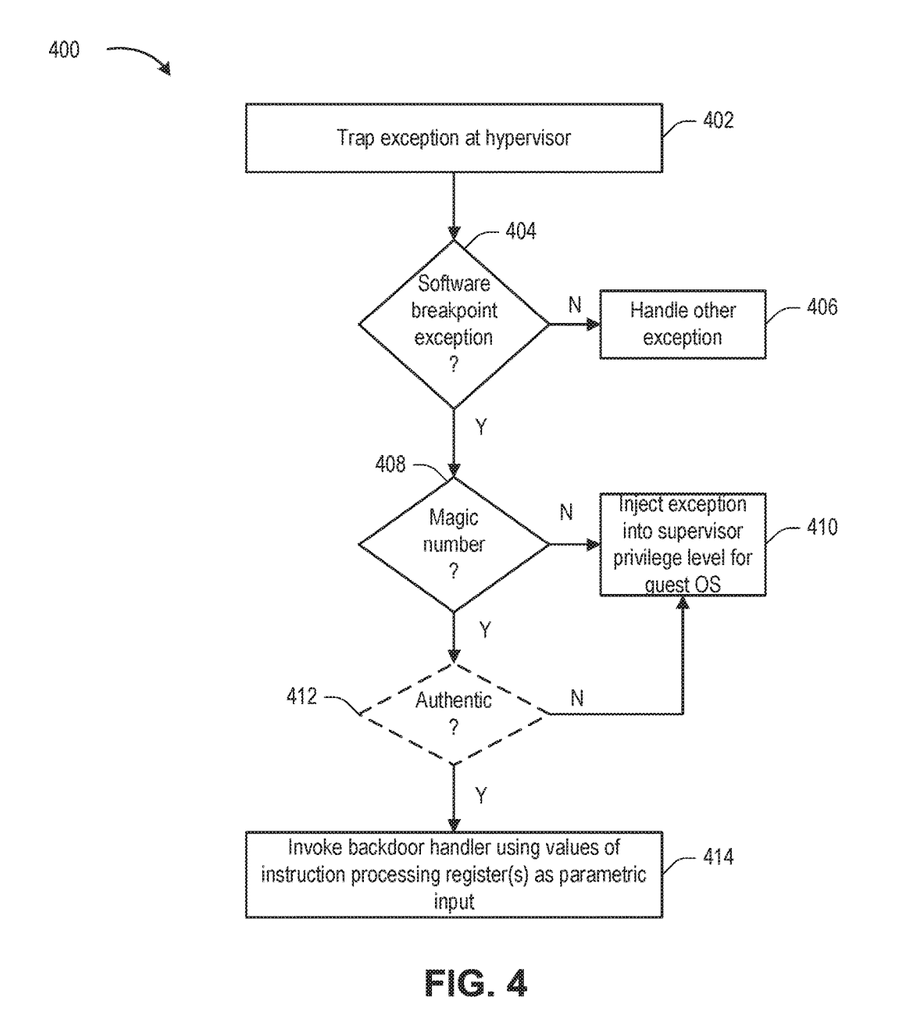
FIG. 4 is a flow diagram depicting a method of handling exceptions at a hypervisor according to an embodiment.

FIG. 4 is a flow diagram depicting a method 400 of handling exceptions at hypervisor 114 according to an embodiment. Method 400 can be performed by exception handler 120. Method 400 begins at step 402, where exception hander 120 traps an exception targeting the third EPL. At step 404, exception handler 120 determines whether the exception is a software breakpoint instruction exception. If not, method 400 proceeds to step 406, where exception handler 120 handles the other exception. If the exception is a software breakpoint instruction exception, method 400 proceeds instead to step 408.

At step 408, exception handler 120 determines if the software breakpoint instruction exception includes an operand set to the magic number. If not, method 400 proceeds to step 410, where exception handler 120 injects the exception into the second EPL (e.g., supervisor privilege level) for handling by guest OS 124. In some cases, the software breakpoint instruction exception can be generated in response a software breakpoint instruction that did not intend to invoke the backdoor interface (e.g., a debugging operation). In such cases, exception handler 120 injects the exception back into the default second EPL so that it can be handled by guest OS 124 in an appropriate manner. If the software breakpoint instruction exception includes an operand set to the magic number, method 400 can proceed to step 414. Optionally, method 400 can first proceed to step 412.

At step 412, exception hander 120 determines whether the backdoor request is authentic. This can prevent false detection of backdoor request based on the magic number alone. If the software happens to execute a software breakpoint instruction with an operand set to the magic number, but did not set instruction set register(s) with the appropriate state, exception hander 120 can determine a false detection of a backdoor request. In such case, method 400 proceeds to step 410, where the exception is injected into the second EPL for handling by guest OS 124. Otherwise, method 400 proceeds to step 414. Exception handler 120 can employ various techniques for authenticating a backdoor request. For example, exception handler 120 can retrieve information from instruction processing register(s) 130 that can be used to authenticate the backdoor request (e.g., a hash of the input parameters, a second magic number, etc.). At step 414, exception handler 120 invokes backdoor service 122 using value(s) of instruction processing register(s) 130 as parametric input.

An example of method 400 is shown in the following pseudocode:

```
exception_handler (uint32 esr_el2, exc_frame * regs) {
    ...
    if (esr_el2.exception_class == 0x3C) {
        if (esr_el2.iss == 0xBD00)
            handle_backdoor (regs);
            return;
    } else {
        inject_el1_brk (regs, esr_el2.iss);
        return;
    }
}
```

In the example, a function exception_handler( ) implements exception handler 120. The function includes two input arguments esr_el2 and regs. The argument esr_el2 is an integer value of the state of an EIR register 135 (e.g., in ARMv8, a register named esr_el2 provides information describing the exception targeting EL2). The argument regs is a pointer to a structure exc_frame that stores state of instruction processing registers 130. The function exception_handler( ) first determines if the exception is a software breakpoint exception (e.g., if esr_el2.exception_class==0x3C). If the exception is a software breakpoint exception, the function checks if the operand matches the magic number (e.g., esr_el2.iss==0xBD00). If so, the function invokes a function handle_backdoor( ) of backdoor service 122 to handle the backdoor request passing the structure regs as an input argument. If the software breakpoint instruction exception does not include an operand set to the magic number, the function invokes inject_el1_brk( ), which injects the exception into the second EPL for handling by the guest OS.

Figure 5:
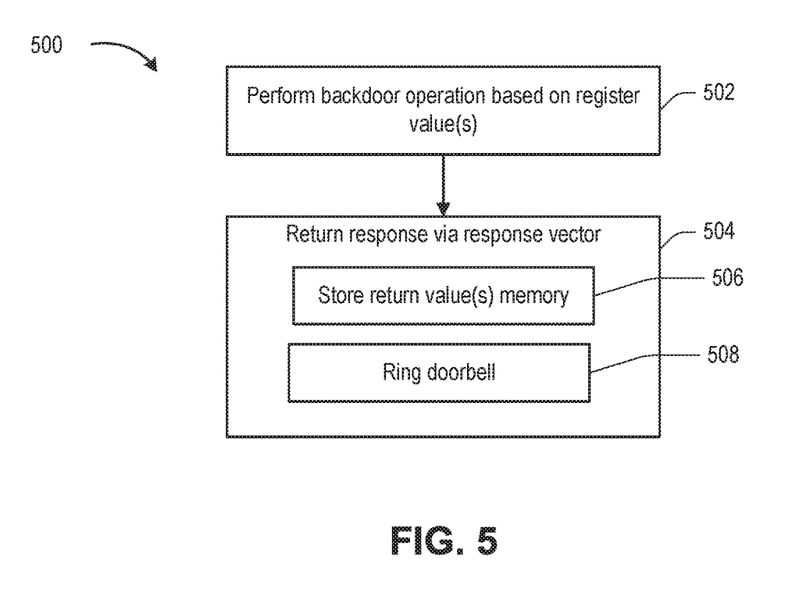
FIG. 5 is a flow diagram depicting a method of executing a backdoor operation according to an embodiment.

FIG. 5 is a flow diagram depicting a method 500 of executing a backdoor operation according to an embodiment. Method 500 can be performed by backdoor service 122. Method 500 begins at step 502, where backdoor service 122 performs the requested backdoor operation based on the received input parameters. For example, the input parameters can select a particular backdoor operation, provide input for the selected backdoor operation, and provide information for a response channel for returning information back to the software. At step 504, backdoor service 122 can return information through the response channel. For example, at step 506, backdoor service 122 can store return values in memory 106 at an address indicated by the software. At step 508, backdoor service 122 can then notify the software of the return data by loading a predefined value at an address indicated by the software (e.g., "ring a doorbell"). When the software detects the predefined value at the specific address, the software can retrieve the return data. Steps 506 and 508 shown one example technique for returning data to the software. Various other techniques can be employed for providing data from backdoor service 122 executing at the third EPL to the software executing at the first or second EPL.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

We claim:

1. A method of providing a backdoor interface between software executing in a virtual machine and a hypervisor executing on a computing system that supports the virtual machine, the method comprising:
    trapping, at the hypervisor, an exception generated in response to execution of a debug instruction on a central processing unit (CPU) by the software;
    identifying, by an exception handler of the hypervisor handling the exception, an equivalence between an immediate operand of the debug instruction and a predefined value; and
    invoking, in response to the equivalence, a backdoor service of the hypervisor using state of at least one register of the CPU as parametric input, the state being set by the software prior to executing the debug instruction.

2. The method of claim 1, wherein the CPU supports at least first, second, and third execution privilege levels in order of increasing privilege, and wherein the hypervisor executes at the third execution privilege level.

3. The method of claim 2, wherein the software executes within a context of a guest operating system of the virtual machine, and wherein the guest operating system executes at either the first execution privilege level or the second execution privilege level.

4. The method of claim 2, wherein the first execution privilege level supports unprivileged execution in the CPU and the third execution privilege level supports virtualized operation of the CPU.

5. The method of claim 4, wherein the CPU does not support an instruction, executable at the first execution privilege level, which generates an exception targeting the third execution privilege level.

6. The method of claim 1, wherein the debug instruction comprises a software breakpoint instruction and the exception comprises a software breakpoint instruction exception, and wherein the method further comprises:
    setting a field in a system register of the CPU to enable trapping of software breakpoint instruction exceptions at an execution privilege level of the hypervisor generated in response to the software breakpoint instruction.

7. The method of claim 1, further comprising:
    evaluating the state of the at least one register of the CPU against pre-defined criteria;
    wherein the backdoor service is invoked in response to the equivalence between the immediate operand of the debug instruction and the predefined value and in response to the state of the at least one register of the CPU satisfying the pre-defined criteria.

8. The method of claim 1, wherein the debug instruction is a first debug instruction and the exception is a first exception, and the method further comprises:
    trapping, at the hypervisor, a second exception generated in response to execution of a second debug instruction on the CPU by the software;
    identifying, by the exception handler of the hypervisor, a non-equivalence between an immediate operand of the second debug instruction and the predefined value; and
    injecting, in response to the non-equivalence, the second exception into a less privileged execution privilege level than that of the hypervisor.

9. The method of claim 8, wherein the software executes within a context of a guest operating system of the virtual machine, and wherein the guest operating system executes at the less privileged execution privilege level.

10. A non-transitory computer readable medium comprising instructions to be executed in a computing device to cause the computing device to carry out a method of providing a backdoor interface between software executing in a virtual machine and a hypervisor executing on a computing device that supports the virtual machine, the method comprising:
    trapping, at the hypervisor, an exception generated in response to execution of a debug instruction on a central processing unit (CPU) by the software;
    identifying, by an exception handler of the hypervisor handling the exception, an equivalence between an immediate operand of the debug instruction and a predefined value; and
    invoking, in response to the equivalence, a backdoor service of the hypervisor using state of at least one register of the CPU as parametric input, the state being set by the software prior to executing the debug instruction.

11. The non-transitory computer readable medium of claim 10, wherein the CPU supports at least first, second, and third execution privilege levels in order of increasing privilege, and wherein the hypervisor executes at the third execution privilege level.

12. The non-transitory computer readable medium of claim 11, wherein the software executes within a context of a guest operating system of the virtual machine, and wherein the guest operating system executes at either the first execution privilege level or the second execution privilege level.

13. The non-transitory computer readable medium of claim 11, wherein the first execution privilege level supports unprivileged execution in the CPU and the third execution privilege level supports virtualized operation of the CPU.

14. The non-transitory computer readable medium of claim 13, wherein the CPU does not support an instruction, executable at the first execution privilege level, which generates an exception targeting the third execution privilege level.

15. The non-transitory computer readable medium of claim 10, wherein the debug instruction comprises a software breakpoint instruction and the exception comprises a software breakpoint instruction exception, and wherein the method further comprises:
    setting a field in a system register of the CPU to enable trapping of software breakpoint instruction exceptions at an execution privilege level of the hypervisor generated in response to the software breakpoint instruction.

16. The non-transitory computer readable medium of claim 10, further comprising:
    evaluating the state of the at least one register of the CPU against pre-defined criteria;
    wherein the backdoor service is invoked in response to the equivalence between the immediate operand of the debug instruction and the predefined value and in response to the state of the at least one register of the CPU satisfying the pre-defined criteria.

17. The non-transitory computer readable medium of claim 10, wherein the debug instruction is a first debug instruction and the exception is a first exception, and the method further comprises:
    trapping, at the hypervisor, a second exception generated in response to execution of a second debug instruction on the CPU by the software;
    identifying, by the exception handler of the hypervisor, a non-equivalence between an immediate operand of the second debug instruction and the predefined value; and
    injecting, in response to the non-equivalence, the second exception into a less privileged execution privilege level than that of the hypervisor.

18. The non-transitory computer readable medium of claim 17, wherein the software executes within a context of a guest operating system of the virtual machine, and wherein the guest operating system executes at the less privileged execution privilege level.

19. A computing device, comprising:
    a hardware platform having a central processing unit (CPU) and memory; and
    a software platform having a hypervisor executing on the hardware platform, the hypervisor supporting a virtual machine having software executing therein, the hypervisor including an exception handling and a backdoor service, the hypervisor configured to:
    trap an exception generated in response to execution of a debug instruction on the CPU by the software;
    identify, by the exception handler, an equivalence between an immediate operand of the debug instruction and a predefined value; and
    invoke, in response to the equivalence, the backdoor service using state of at least one register of the CPU as parametric input, the state being set by the software prior to executing the debug instruction.

20. The computing device of claim 19, wherein the CPU supports at least first, second, and third execution privilege levels in order of increasing privilege, wherein the hypervisor executes at the third execution privilege level, wherein the software executes within a context of a guest operating system of the virtual machine, and wherein the guest operating system executes at either the first execution privilege level or the second execution privilege level.

* * * * *